UNITED STATES PATENT OFFICE.

GEORGE TUCKER, OF BROCKTON, MASSACHUSETTS.

INSULATING AND WATERPROOFING COMPOSITION FOR ELECTRICAL APPLIANCES.

1,311,301.  
Specification of Letters Patent.  
Patented July 29, 1919.

No Drawing.  Application filed June 1, 1918. Serial No. 237,754.

*To all whom it may concern:*

Be it known that I, GEORGE TUCKER, a citizen of the United States, residing at Brockton, in the county of Plymouth and State of Massachusetts, ha.e invented certain new and useful Improvements in Insulating and Waterproofing Composition for Electrical Appliances, of which the following is a specification.

This invention relates to coatings designed to be disposed on electrical instruments or elements for rendering them waterproof, and a compound which is particularly useful as a coating for insulating and rendering waterproof the field magnets of electrical motors, such as are used on electric railway cars.

The object of my invention is to provide a preparation which may be used on the field magnets and armatures of motors so that water will not cause the burning out of the field or otherwise effect the operation of the motor, and in this connection to provide a preparation which may be readily and cheaply formed and easily applied.

My preparation or compound for this purpose consists of rosin and linseed oil, and in forming the compound, I mix thoroughly six pounds of red rosin with one pint of boiled linseed oil. These ingredients are thoroughly mixed in a suitable vessel and then boiled for an hour and a half. Of course the same proportions will be used for larger or smaller quantities. The oil softens the rosin and makes it elastic, and neither the heat of summer, nor the cold of winter has any effect, as a consequence, upon the coating applied to the field magnets, armatures, or other parts. If desired, a small amount of lamp black can be added to the compound to color it, but this has no effect upon the insulating or waterproof qualities of the compound. Preferably, after the compound has been applied and relatively dried, I apply over the coating of the compound a coating of shellac. This shellac forms a finishing coating, prevents the parts from sticking together and acts as a protection to the insulating and waterproofing coating.

Where this coating is applied to armatures the compound is applied hot with a brush. Fields and magnets, however, may be dipped in the hot solution as often as the case requires. For instance, an electrical field may be dipped in the hot solution and then as soon as possible it is taped with strong cotton tape. It is again dipped in the hot solution, taped again and over this last layer of tape a final coating of shellac is applied.

Having described my invention, what I claim is:

1. A composition for insulating and waterproofing electrical elements consisting of a mixture of rosin and linseed oil.

2. A composition for insulating and waterproofing electrical elements consisting of a mixture of rosin and linseed oil in the proportions of six pounds of red rosin to one pint of linseed oil.

In testimony whereof I hereunto affix my signature in the presence of two witnesses.

GEORGE TUCKER.

Witnesses:
WILLIAM FRASER,
ALBERT H. BLACKSTONE.